Dec. 6, 1966  H. B. JERKINS  3,289,801
GAS OPERATED COIN CONTROLLED OUTDOOR GRILL
Filed March 19, 1965  2 Sheets-Sheet 1
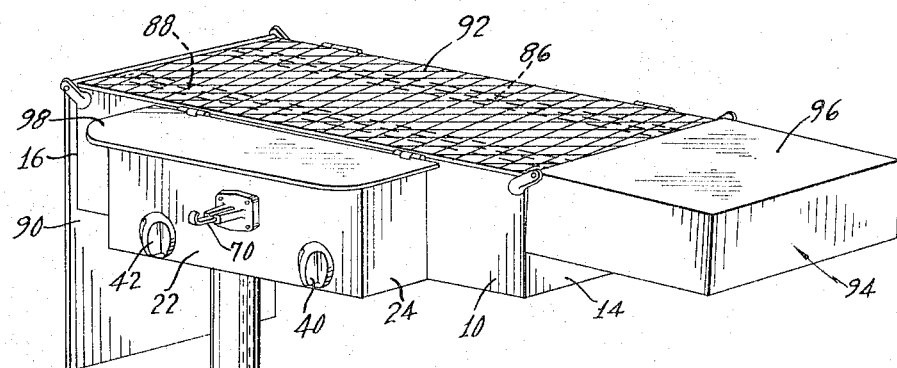
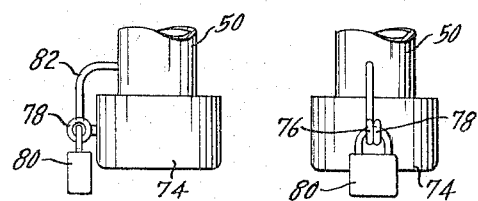
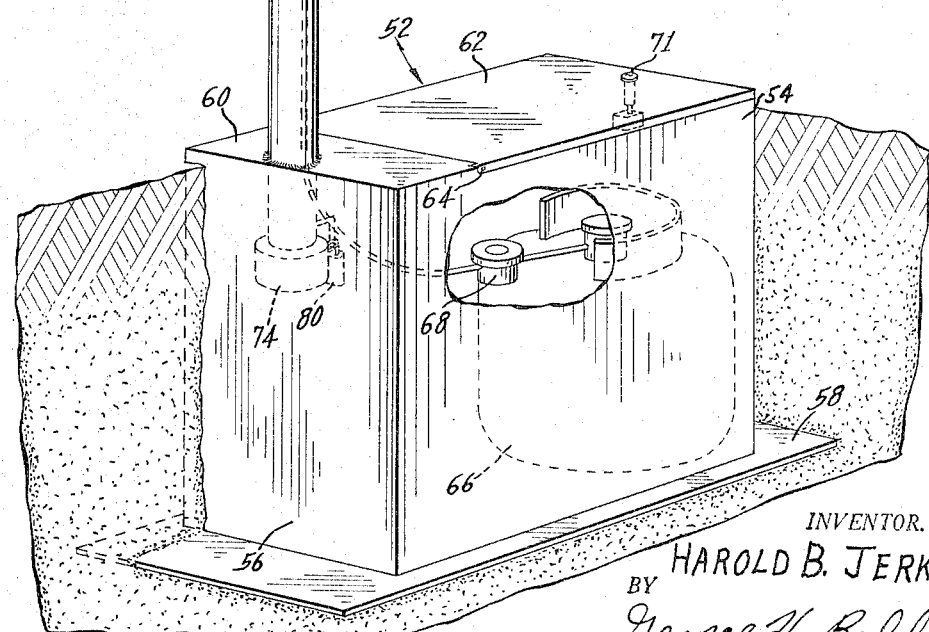
INVENTOR.
HAROLD B. JERKINS
BY George H. Baldwin
ATTORNEY Dec. 6, 1966  H. B. JERKINS  3,289,801
GAS OPERATED COIN CONTROLLED OUTDOOR GRILL
Filed March 19, 1965  2 Sheets-Sheet 2

INVENTOR.
HAROLD B. JERKINS
BY George H. Baldwin
ATTORNEY

United States Patent Office 3,289,801
Patented Dec. 6, 1966

1

3,289,801
GAS OPERATED COIN CONTROLLED
OUTDOOR GRILL
Harold B. Jerkins, Tallahassee, Fla., assignor to Kamp
Kooker, Inc., Tallahassee, Fla., a corporation of Florida
Filed Mar. 19, 1965, Ser. No. 441,137
13 Claims. (Cl. 194—3)

This invention relates to outdoor grills or camp stoves particularly adapted to be located in camping or other recreational areas.

It is not uncommon for commercial or governmental controlled camping or picnic areas to provide grills for the use of people patronizing the area. Most often such grills or camp stoves are adapted to be fired by wood or charcoal and are most frequently located in exposed locations. Under adverse weather conditions the stove, fuel or both may become so wet as to render it difficult, if not impossible, to use. Accordingly, it is a primary object of the present invention to provide a novel and improved outdoor grill which is fired by bottled gas thereby permitting its use year round, eliminating the need for the user either to supply his own fuel or carry fuel from a central supply, and eliminate the problem of wet fuel.

One problem which could be encountered in providing a bottled gas fired outdoor cooking grill is that the grill would normally be unattended, and users might accidentally or otherwise fail to turn off the gas supply when they were finished using the grill. Also, the cost of supplying fuel to camp stoves is now often borne by the area operator. The cost of supplying this fuel can be quite substantial in an area where there are a number of such stoves. Accordingly, it is a further object of the present invention to provide a bottled gas fired cooking grill of the general type described which is coin controlled, whereby the user, by depositing a specified coin in the coin controlled timing device on the stove, may obtain the use of the stove for a predetermined length of time, and at the end of this time, the gas supplied to the stove will be automatically shut off, thus assuring that gas will not be wasted, and permitting the area operator to recover his cost for the fuel supplied.

It is a further object of the present invention to provide a novel and improved camp stove which will incorporate integral yet selectively usable components for performing a variety of cooking functions such as open fire grilling, pan cooking, deep fat frying and grilling.

It is still another object of the present invention to provide a novel and improved coin controlled gas fired camp stove including means for preventing the theft of coins deposited in the stove.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is an isometric view of a coin controlled, gas fired camp stove constructed in accordance with the present invention;

FIG. 5 is an enlarged side view of a portion of the stove of FIG. 1; and

FIG. 6 is a front view of the portion of the stove of FIG. 5.

2

Figure 2:
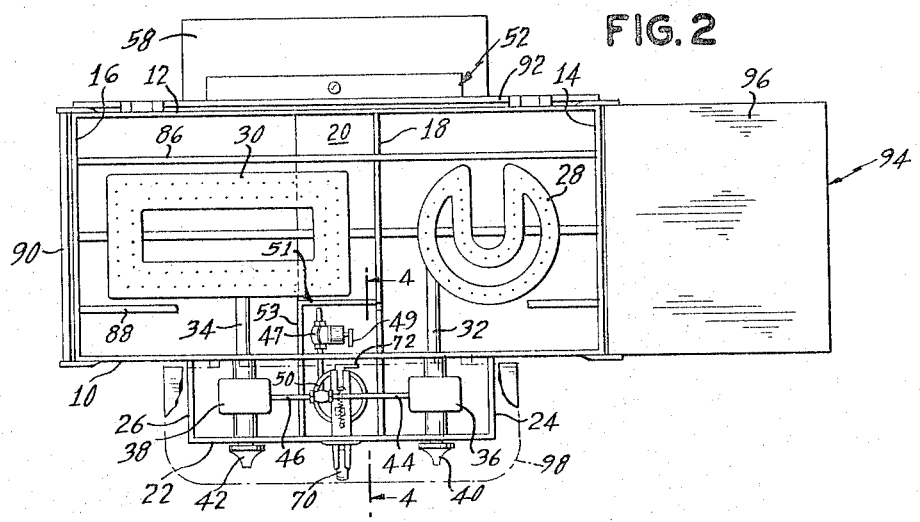
FIG. 2 is a top view of the stove of FIG. 1.
Figure 3:
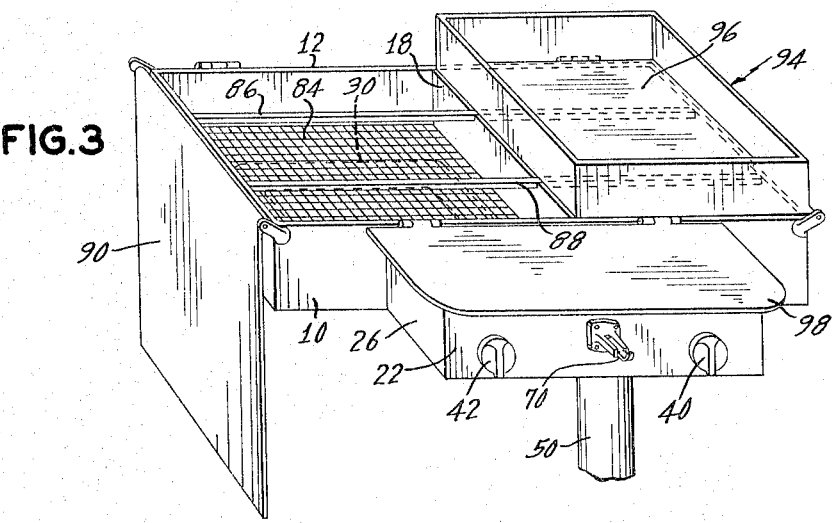
FIG. 3 is a fragmentary isometric view of the stove of FIG. 1.
Figure 4:
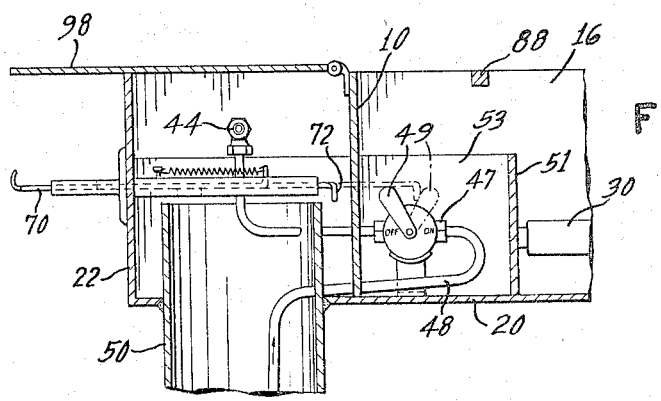
FIG. 4 is an enlarged, cross-sectional view substantially along the line 4—4 of FIG. 2.

With reference to the drawings and particularly FIGS. 1 to 3 a coin controlled camp stove constructed in accordance with the present invention comprises a generally rectangular frame including a front wall 10 and rear wall 12 connected at their ends to side walls 14 and 16. Extending between the front and rear walls 10 and 12, and fixed thereto, is a dividing wall or partition 18 which divides the frame into two portions and serves to strengthen the frame. As shown in FIGS. 2 and 4 a partial bottom wall 20 extends between the front and rear walls 10 and 12 and is suitably fixed, as by welding, along the lower edge of the divider wall 18. The foregoing described parts of the frames are preferably fabricated from a suitably corrosion resistant material, as are all of other parts of the stove, particularly those exposed to weather. A front panel 22 extends in parallel and forwardly spaced relation to the front wall 10. The panel is substantially shorter than the front wall and is fixedly supported on the front wall by a pair of end members 24 and 26 by suitable means, such as welding.

Disposed within the confines of the frame are a pair of heating elements in the form of gas burners 28 and 30. In the specific embodiment shown, the burner 28 is of generally circular configuration, while the burner 30 is of rectangular configuration. Further, it will be observed that the portion of the frame containing the burner 30 is of somewhat greater length than the portion containing the burner 28. The burners are supported on the side or end walls 14 and 16 and partition 18 by suitable means and are located adjacent the bottom of the frame. The burners 28 and 30 are supplied with fuel by the means of pipes 32, 34, respectively, which extend through the front wall 10 to control valves 36 and 38 disposed between the front panel 22 and front wall 10. The valves are provided with control handles 40, 42 for manually controlling the amount of fuel fed to each of the burners independently and for selectively shutting off the flow of fuel to each of the burners. The inlets of the control valves are connected to pipes 44, 46 which are connected to a T, not shown, which in turn is connected to a mechanical timer control valve 47 of conventional construction and having a pivotable timer actuating lever 49. The timer valve comprises a valve which permits the flow of gas to both of the pipes 44, 46 in response to rotation of the timer actuating lever 49 in a clockwise direction as viewed in FIG. 4, whereupon the valve is opened and the timer is mechanically wound and will drive the lever 49 in a counterclockwise direction back to the starting position shown in FIG. 4. During the duration of the operation of the timer the gas flow controlling valve will be open, and upon termination of the time period the valve will close and remain closed until the lever 49 is again reset in a clockwise direction. The inlet of the valve 47 is connected to a pipe 48 extending downwardly through a tubular hollow post 50 which supports the stove frame and elements mounted thereon.

The post 50 is fixed at its upper end to the bottom wall 20 of the frame, as by welding. The upper end of the post 50 extends upwardly through the bottom wall 20 a short distance for a purpose to be hereinafter described. As shown in FIG. 1, the lower end of the post 50 extends into a receptacle or housing generally indicated at 52 providing a base for the stove. The receptacle comprises side walls 54 and end walls 56 and is generally rectangular. The receptacle further comprises a bottom wall which closes the bottom of the receptacle and extends outwardly of each of the side and end walls of the receptacle to provide a securing flange 58 entirely about the bottom of the receptacle. The receptacle is further provided with a top, a portion 60 of which is fixed to the side walls of the receptacle and a portion 62 of which is hinged, as at 64, for pivoting about an axis extending between the side walls of the receptacle. The receptacle is weather tight and is adapted to be buried in the ground with the top of the receptacle preferably being flush or slightly raised above ground level. The flange 58 provides a ground engageable anchor for the receptacle preventing the receptacle from being removed once it is buried without digging out entirely around the receptacle. The post 50 is rigidly secured to the receptacle by suitable means, such as welding, whereby when the receptacle has been buried the stove will be rigidly supported in the ground. The receptacle contains a bottle 66 of liquified gas which is the source of energy for the burners 28, 30 and which is connected through a regulator assembly 68 to the supply pipe 48. A key operated lock 71 is provided to lock the hinged cover portion 62 and prevent unauthorized entry into the receptacle 52. It will be noted that the post 50 extends into the receptacle 52 next adjacent one end wall 56 and that the receptacle extends from the post 50 in a direction away from the front panel 22 of the stove. In this manner the hinged cover portion 62 of the receptacle will be disposed rearwardly of the cooking portion of the stove, so that a person using the stove will not be standing on the receptacle cover, which could cause damage to the same.

Referring now to FIGS. 2 and 4 the actuation of the timer valve 47 is effected by coin controlled means which in the specific embodiment shown is a coin slide mechanism of substantially conventional construction mounted on the panel 22. The slide mechanism comprises a slide 70 extending outwardly of the front panel and having an opening for the reception of a suitable coin. The slide 70 is movable inwardly of the panel to position the coin receiving opening in registry with the open upper end of the post 50, whereby the coin will drop down into the open upper end of the post 50. In accordance with the invention, the slide is provided with a depending leg or post 72 at its inner end which is engageable with the lever 49 on the timer valve 47 so as to move the lever 49 in a clockwise direction a predetermined angular distance in response to movement of the slide inwardly of the panel 22. The slide 70, as is conventional, may not be moved inwardly sufficiently to engage the timer lever 49 unless a coin of selected denomination has been placed in the slot. Accordingly, as the slide is moved inwardly the timer valve 47 is set, and gas will be supplied to the burners for a prescribed interval.

The timer valve 47 is suitably fixed relative to the coin slide mechanism and is substantially enclosed to prevent unauthorized access to the timer to prevent actuation of the control lever 49 on the timer without properly actuating the coin slide 70. More particularly the timer is located next adjacent the partition 18 and front wall 10 which serve as one side and front of the container housing the timer. The rear wall 51 of the timer housing extends outwardly from the partition 18 and is connected at its other end to a side wall 53. The wall 53 is supported on the front wall 10 and extends and parallel to the partition 18. A suitable cover, not shown, is provided to extend over the timer enclosure. The bottom of the timer enclosure is formed by the partial bottom wall 20 of the frame. An opening is provided in the front wall 10 for reception of the slide 70 and any associated elements, but this opening is not of a size to permit unauthorized access to the timer.

The coins drop down the support post 50, which as shown in FIGS. 1, 5 and 6 is closed at its lower end by a pipe cap 74. The lower end of the post 50 is disposed within the receptacle 52 so that access thereto may not be gained without opening the cover lock 71 on the receptacle. Additionally, means are provided for locking the cap 74 to the lower end of the post 50 to prevent unauthorized access to the coins contained within the post. In the particular embodiment shown, the post 50 and cap 74 are provided with a pair of eyes 76, 78 adapted to be disposed in side by side aligned relation, whereby a padlock 80 may be passed through the eyes to prevent removal of the end cap 74. The eye 76 on the post 50 is supported by shank 82 mounted on the post 50. The shank 82 may if desired be pivotably mounted to permit the eyes 76 to be swung out of the way and permit the end cap 74 to be threaded onto the bottom of the post a plurality of turns before being locked in place. The end cap 74 need not be threaded tightly onto the post 50, inasmuch as the lock 80 prevents relative rotation between the two members.

Returning to a consideration of FIGS. 1 to 3 the stove further comprises a grid 84 which overlies the burner 30 in closely adjacent relation. The grid 84 suitably supported on the frame and is adapted to support a plurality of pieces of volcanic rock or lava for use in charcoal grilling of meats. It has been found that when material such lava is placed on the grid over a flame burner, and meat is grilled by means of radiant heat from the heated lava, the result will be closely similar to that achieved in charcoal cooking.

Extending between the end walls 14 and 16 of the frame are a pair of support rods 86, 88. The rods 86, 88 are fixed at their ends to the end walls and also are supported on the partition 18. These rods provide means for the support of a cooking utensil and are disposed with their top surfaces substantially flush with the tops of the end walls of the frame. The stove further comprises a flat, rectangular grill plate 90. The grill plate 90 is hingely mounted at one end on the front and rear walls 10 and 12 for movement about an axis extending parallel to and next adjacent, but spaced above, the upper edge of the end wall 16, whereby the plate 90 may be moved between a position wherein it overlies the portion of the frame containing the burner 30 to a depending position as shown in FIG. 1. The plate 90 has a length substantially equal to the distance between the end wall 16 and partition 18.

As shown in FIG. 1, the stove further comprises a hinged grid 92 which rests upon the rods 86 and 88 and/or the upper edges of the vertical walls of the frame of the stove. Accordingly, the pivotal axis of the grill plate 90 is located vertically such that the plate 90 may be pivoted to overly the grid 92 when the grid is in place, whereby the grill plate 90 serves as a closure for the underlying portion of the frame. In this connection the grill plate 90 has a width at least equal to the width of the frame so that the grill plate overlies the top edges of the front and rear walls 10 and 12. The grid 92 is hingedly mounted on the frame for movement about an axis extending parallel to and next adjacent the top edge of the rear wall 12.

The stove further comprises a utensil which may be used as a fry pan or warming oven 94 which as shown in FIGS. 1 and 3 is a rectangular four-sided member having a bottom wall 96. The fry pan 94 is hinged along one bottom edge by hinge means suitably secured to the front and rear walls 10 and 12 of the frame so that the fry pan may be pivoted about an axis extending parallel to the upper edge of the end wall 14. The fry pan may be moved between a position wherein it rests upon the removable grid 92 or rods 86, 88 and a position wherein the fry pan is inverted and extends outwardly from the end wall 14 with the underside of the bottom of the fry pan forming a work area substantially co-planar with the top of the frame. The movement of the fry pan outwardly of the stove is limited by engagement of the next adjacent side of the fry pan with the end wall 14. When the fry pan 94 is in the portion shown in FIG. 3, the free end of the fry pan is disposed next adjacent the position of the end of the grill plate 90 when it is pivoted so as to overly the frame of the stove, thereby providing a substantially complete closure for the top of the stove. In this connection the fry pan has a width at least equal to the width of the frame and a length substantially equal to the distance between the end wall 14 and partition 18. It will of course be apparent when the fry pan is in the position shown in FIG. 3 it may be heated by the burner 28.

The stove further comprises a hinged counter or plate 98 which is of elongated flat rectangular configuration and is hingedly mounted, by suitable means, on the front wall 10 for pivoting of its rear edge about an axis extending generally alongside the upper edge of the front wall 10. The counter 98 provides a work area in front of the stove and also serves as a cover for the underlying portion of the stove, and particularly the components on the front wall 22, to protect the same from weather, falling branches, etc. The counter 98 may be pivoted upwardly so as to gain access to the control valves 36 and 38 and other associated structure.

Thus, it will be seen that there has been provided a novel and improved camp stove fulfilling all of the objects aforestated. The stove provides the user with a plurality of readily available units to perform a variety of cooking functions. More particularly, the portion of the stove corresponding to the area containing the burner 30 may be used for charcoal effect grilling of steaks and the like using the grid 92. The grid 92 may be pivotally swung out of the way to depend from the rear wall 12 whereby both burners may be used in association with conventional cooking utensils supported on the rods 86, 88. Further, the grill plate 90 may be used for grilling meat or sandwiches and the fry pan 94 may be used either as a work area or may be swung over the burner 28 and used for deep fat frying, or with a suitable cover, it may be used as a warming oven or as a conventional kettle. To use the stove, the user need merely insrt a coin of proper denomination into the coin slide and push the slide inwardly to actuate the timer-valve supplying gas to the burners. Thereafter, the manually controllable knobs 40 and 42 are turned to selectively supply fuel at the desired rate to each of the burners. A substantial quantity of coins may be contained within the post 50, so that the collection of these coins may be accomplished at rather infrequent intervals generally corresponding to replacement of the bottle containing the gas. Lastly, when the stove is not in use the gird 92 may be swung over the frame and the grill 90 and fry pan 94 swung over the grid 92 so as substantially to close the stove to protect it.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A coin controlled, camp stove comprising a frame, at least one heating element carried by the frame, means for supporting said frame above the ground including a hollow generally vertically extending support member, means for controlling the energizing of said heating element including coin receivable means carried by said frame, said coin receivable means having means for discharging a coin deposited therein, and means for collecting the coins discharged from said coin collecting means including said hollow support member, said coin collecting means including means closely adjacent the lower end of said hollow support member and adjacent the ground for removal of the collected coins therein.

2. A coin controlled, gas fired camp stove comprising a frame, at least one burner supported by said frame, means for supporting said frame above the ground including a vertically extending hollow support member, a source of gas, means for connecting said source to said burner including a valve, a timer for actuating said valve and coin receivable means for actuating said timer, said coin receivable means having means for discharging a coin deposited therein, and means for collecting the coins discharged from said coin receivable means including said hollow support member, and means for removal of the collected coins from said hollow support member closely adjacent the lower end thereof and adjacent the ground.

3. A coin controlled, gas fired camp stove comprising a frame, at least one burner supported by said frame, means for supporting said frame including a receptacle, a gas means disposed within said receptacle, means for connecting said gas means to said burner including a valve, a timer for actuating said valve, and coin receivable means for actuating said timer, said coin receivable means having means for discharging a coin deposited therein, and means for collecting coins discharged from said coin receivable means including a generally vertically extending hollow support member fixed to said receptacle, said hollow support member being connected to and between said receptacle and said frame for supporting said frame above the ground, said support member including means closely adjacent the ground for removal of the collected coins in said hollow member.

4. In the coin controlled, gas fired camp stove as defined in claim 3, wherein said gas means comprises a gas container, said means for connecting said gas means to said burner further including a pipe extending from said container into said hollow support member and upwardly at least partially through said support member, said receptacle being provided with a locked cover for removal and installation of said container.

5. In the coin controlled, gas fired camp stove as defined in claim 3, wherein the lower end of said support member being disposed within said receptacle, said means closely adjacent the ground being positioned to selectively close the lower end of said support member whereby coins deposited in the upper end of the support member will be collected in the lower end thereof, and means providing controlled access to the interior of said receptacle.

6. In the coin controlled, gas fired camp stove as defined in claim 4, wherein said receptacle further being provided with a displaceable cover whereby said container may be removed from said receptacle, the upper end of said support member being positioned to receive coins discharged from said coin receivable means, the lower end of said support member being disposed within said receptacle, said means closely adjacent the ground being positioned to selectively close the lower end of said support member whereby coins deposited in the upper end portion thereof will be collected in the lower end thereof, lock means for preventing unauthorized removal of said means closely adjacent the ground.

7. In the coin controlled, gas fired camp stove as defined in claim 4, wherein said receptacle further being adapted to be at least partially buried in the ground, said frame having a front portion in front of which the stove user would normally stand, said receptacle extending rearwardly of said front portion with said gas container therein so that a stove user will not be standing on said receptacle.

8. A coin controlled gas fired camp stove comprising a frame, at least one burner carried by said frame, means for supporting the frame above the ground including a receptacle at least partially buried in the ground, a container of gas disposed within said receptacle, means for connecting said container to said burner including a valve, a timer for actuating said valve, coin receivable means for actuating said timer, said coin receivable means having means for discharging a coin deposited therein, and a generally vertically extending hollow tubular support member fixed to said receptacle and to said frame, the upper end of said support member being positioned to receive coins discharged from said coin receivable means, the lower end of said support member being disposed within said receptacle, the coins being passed through said hollow tubular support member toward the lower end thereof and toward said receptacle for collection generally within said receptacle.

9. A coin controlled gas fired camp stove comprising a frame, at least one burner carried by said frame, means for supporting the frame above the ground including a receptacle at least partially buried in the ground, a container of gas disposed within said receptacle, means for connecting said container to said burner including a valve, a timer for actuating said valve, coin receivable means for actuating said timer, said coin receivable means having means for discharging a coin deposited therein, a generally vertically extending tubular support member fixed to said receptacle and to said frame, the upper end of said support member being positioned to receive coins discharged from said coin receivable means, the lower end of said support member being disposed within said receptacle, a removable closure member for the lower end of said support member, said receptacle being provided with a displaceable cover for obtaining access to the interior of the receptacle, and means for preventing unauthorized displacement of said cover.

10. In the camp stove as defined in claim 9, said receptacle having laterally outwardly extending anchor means disposed below the ground for impeding removal of the receptacle from the ground.

11. In a coin controlled camp stove, a frame having a front wall, a rear wall and a pair of side walls, a grid overlying said frame and being at least substantially coextensive with said frame, means hingedly mounting said grid on the frame for swinging movement about an axis extending parallel to and adjacent the upper edge of said rear wall, a grill overlying said grid and extending from adjacent one side wall toward the other side wall, means mounting said grill for swinging movement about an axis extending parallel to and adjacent the upper edge of said one side wall, a cooking utensil having a bottom wall and upstanding side and end walls, said utensil overlying said grid and extending from said other side wall to the next adjacent end of said grill whereby said grill and utensil provide a cover for said stove, means mounting said utensil on said frame for swinging movement about an axis extending parallel to and adjacent the upper edge of said other side wall, a pair of heating elements carried by said frame in respective underlying registry with said grill and utensil, a source of energy for said elements, and means for controlling the supply of energy to said elements including coin controlled means for supplying energy for said elements for a predetermined time interval.

12. In a coin controlled camp stove, a frame having a front wall, a rear wall and a pair of side walls, a grid overlying said frame and being at least substantially coextensive with said frame, means hingedly mounting said grid on the frame for swinging movement about an axis extending parallel to and adjacent the upper edge of said rear wall, a grill overlying said grid and extending from adjacent one side wall toward the other side wall, means mounting said grill for swinging movement about an axis extending parallel to and adjacent the upper edge of said one side wall, a cooking utensil having a bottom wall and upstanding side and end walls, said utensil overlying said grid and extending from said other side wall to the next adjacent end of said grill whereby said grill and utensil provide a cover for said stove, and means mounting said utensil on said frame for swinging movement about an axis extending parallel to and adjacent the upper edge of said other side wall.

13. In a coin controlled camp stove, a frame having a plurality of upper edges, a grill, means mounting said grill for swinging movement about an axis extending parallel to and adjacent one of said edges and between a pair of angularly displaced positions in one of which the grill overlies a portion of said frame, a cooking utensil having a flat bottom and upstanding walls, and means mounting said utensil on the frame for swinging movement about an axis extending parallel to and adjacent one of said edges and between a first position in which said bottom of said utensil overlies said frame alongside said grill and a second position in which said utensil is inverted so that the underside of the bottom wall thereof provides a generally horizontally extending working surface.

References Cited by the Examiner

UNITED STATES PATENTS

| 1,977,267 | 10/1934 | Endacott | 222—3 |
| 2,559,243 | 7/1951 | Brown | 126—9 |
| 2,946,275 | 7/1960 | Compton. | |
| 3,006,406 | 10/1961 | Goddard | 222—3 X |

FOREIGN PATENTS 523,390  7/1940  Great Britain.

ROBERT B. REEVES, *Primary Examiner.*

STANLEY H. TOLLBERG, *Examiner.*